… …

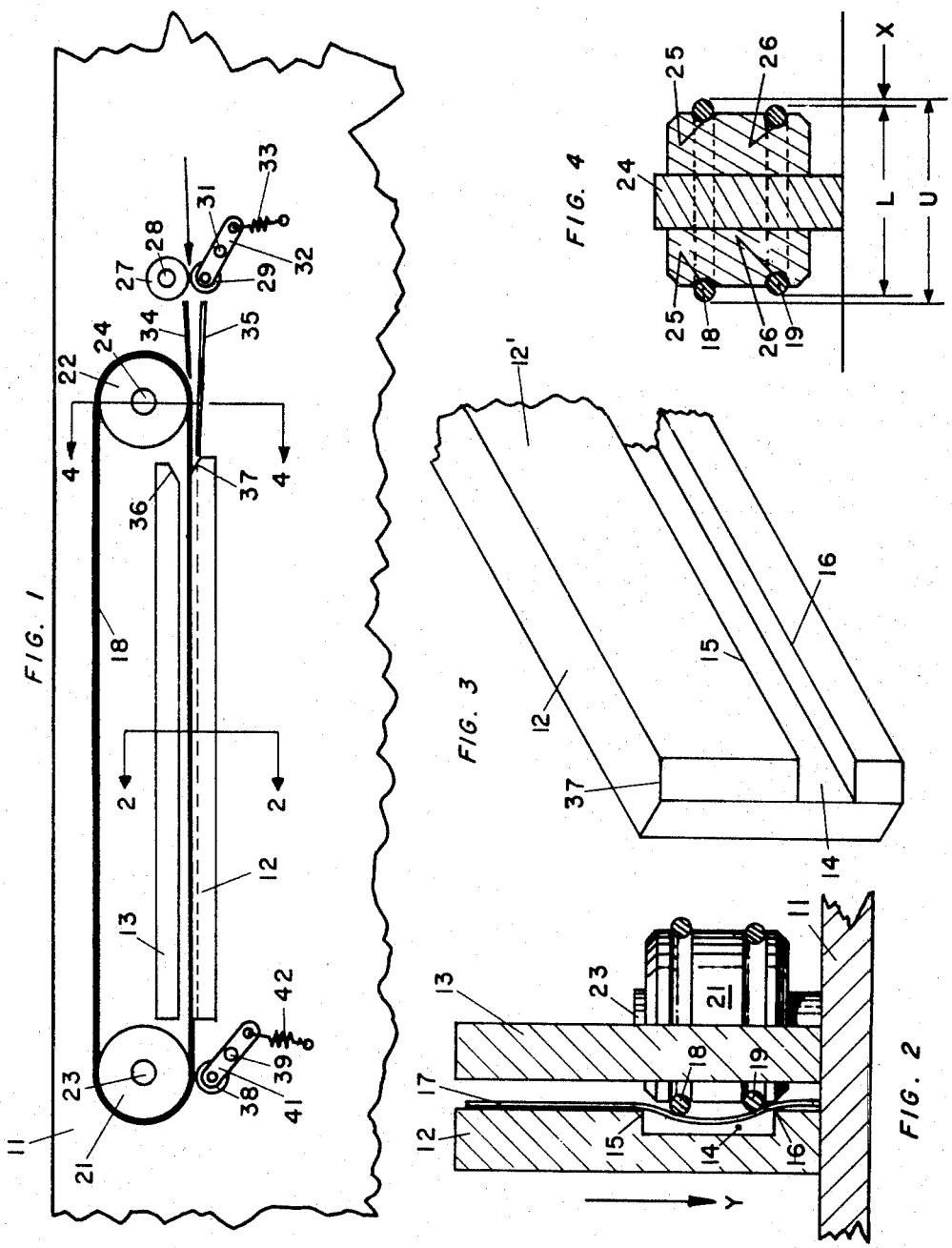

United States Patent Office 3,415,509
Patented Dec. 10, 1968

3,415,509
DOCUMENT HANDLING APPARATUS
Robert M. Tyburski, Fairfax County, and Robert F. Springer, Prince William County, Va., assignors to Farrington Electronics, Inc., Springfield, Va., a corporation of Massachusetts
Filed Oct. 13, 1966, Ser. No. 586,419
16 Claims. (Cl. 271—45)

ABSTRACT OF THE DISCLOSURE

A document transport device is disclosed wherein a guide plate having a recess therein is disposed at one side of the document transport path. At the other side is disposed a pair of O-rings which run on a suitable pulley system. The O-rings extend into the guide plate recess and thus, documents can be transported from one end of the guide path to the other along the guide path between the recess and the pair of O-rings. The upper one of the pair of belts is driven at a higher rate of speed than the lower one thereby rotating the documents downwardly and preventing them from flying up and away from the document transport path.

---

The present invention relates to document handling apparatus, and more particularly to improved apparatus for advancing, stopping or aligning a single continuous document or a series of separable documents of random varying sizes and thicknesses.

Numerous types of feedfing apparatus currently being used for controlling intermittent movement of documents traveling at high speeds from an input stacker to an output stacker, are provided with a continuously driven roller and an idler roller which coperate to drive a document when the idler roller is biased into pinching contact with the driver roller. In such an arrangement the rolls contact a relatively small area of the document, and since the rolls must impart very high local inertia forces to the document, in many instances scuffing and/or tearing of the documents occurs. Due to the necessity for exact spacing between each idler roller and drive roller, the feed system is not versatile in that it will not readily accommodate documents of random varying thicknesses, but is adjustable for only a narrow preselected range of document thicknesses. Many additional difficulties have been found to exist with such feeds at the ever increasing document feed rates and throughputs being sought in the data processing machines, such as: mutilation of documents when jamming occurs, wearing of the roller bearings introducing a variable gap between the idler roller and drive roller effecting the document velocity and/or introducing jamming, and complex gear couplings for mechanically driving the drive rollers in synchronism to provide a constant document velocity.

Further, the roller type arrangements, economically speaking, are not practical for handling short documents considering that the distance between rollers must be less than the length of the shortest document in order to maintain positive control over the document movement, and thus a large number of these expensive rollers and a considerable amount of additional mechanical hardware would be required to closely space the feed rolls along a feed path for transporting short documents. Of course, when the document size is mentioned herein, it is mainly with reference to that dimension of a document which is parallel to the path along which it is being transported.

Another significant requirement in this document feed area is the necessity for alignment of documents against some registration edge while the documents are being fed or transported. This requirement is of the utmost importance when information or intelligence on a certain part of the traveling document is to be scanned by some reading means adapted to scan a particular area or areas on the document relative to some reference.

Accordingly, it is an object of the present invention to provide a document handling apparatus which is inexpensive and yet capable of handling documents of random varying sizes and thicknesses.

Another object is to provide an inexpensive apparatus operable to drive documents positively or positively brake documents against movement, so that such sheets may be fed intermittently and yet always under positive control.

Still another object is to provide document handling apparatus capable of stopping a document or flow of documents while traveling at high speed and without document mutilation in the event jamming occurs, and is further capable of restarting a document with a minimum of inertia corresponding substantially to only that of the sheet itself.

A further object of the present invention is the provision of aligning documents of varying lengths, widths and thicknesses against a stationary or moving registration edge.

Yet a further object of the present invention is to provide inexpensive document handling apparatus capable of positively driving documents of random varying sizes and thickness at high speeds and substantially constant velocity, the same apparatus capable of simultaneously aligning the documents against a registration edge.

According to these objects the document handling apparatus herein illustrated and embodying the invention comprises a longitudinally extending planar surfaced stationary guide body having an aperture, cut-out, or recess along its length, and at least a pair of positive driven narrow spaced belts arranged to lie in a path parallel to the longitudinal planar surface of the guide body yet slightly extended within the opening defined by the aperture, cut-out or recess formed. Relative to the documents to be fed, the planar surface of the guide body has a very low coefficient of friction while the coefficient of friction of the belts is made to be quite high.

In an improvement comprising a further aspect of the present invention the aligning mechanism comprises an arrangement to drive a first one of the two narrow spaced belts at a speed slightly higher than the speed of the second one of the two belts aligning the document transverse to the direction of the feed against some reference surface, which may be either above or below the path traveled by the document.

Other objects, advantages, and capabilities of the present invention will become apparent from the following detail description, taken in conjunction with the accompanying drawings illustrating a preferred embodiment of the invention.

In the drawings:
FIGURE 1 is a plan view of a document driving and aligning mechanism embodying the invention.
FIGURE 2 is a section taken along the line 2—2 of FIGURE 1.
FIGURE 3 is a perspective view of one embodiment of the guide plate 12 shown in FIGURE 1.
FIGURE 4 is a section taken along the line 4—4 of the roller 22 in FIGURE 1.

Referring to the drawings, there is shown in FIGURES 1 and 2, the document handling apparatus of the present invention wherein a base chassis 11 supports a pair of longitudinally extending stationary guide plates 12 and 13, each guide plate being of suitable thickness for its intended purpose which will become apparent hereinafter. Each of the opposing surfaces of the guide plates forms a plane which is in substantial parallel relationship with the other, and each of the planar surfaces have a very low coefficient of friction, thereby having a minimum effect on documents traveling at high speeds therebetween adjacent each of the two guide plate surfaces. For example, a more desirable planar surface might comprise materials such as plated chrome, polished aluminium or polished steel to give the effect sought, however, materials such as plastic sold under the name nylon or the trademark Delrin or Teflon have also been found to be suitable even though some of the specified plastics might have a higher coefficient of friction than the type of metals noted above, and although some wearing of the plastic type materials may occur.

The guide plate 12 is provided with a rectangular shaped recess 14 at its lower end which recess extends the entire length of the guide plate as shown in FIGURE 3, and is made in this particular embodiment to lie parallel with the base chassis. It is observed that the recess has been cut into the guide plates at right angles thereto to form a pair of sharp parallel edges 15 and 16 since it is at these points where a traveling document 17 will continuously have contact with and slide by guide plate 12, as illustrated in FIGURE 2, and thus minimum friction will be encountered as a result of the sharp edges, however, slightly rounded edges may also be suitable.

At least two laterally spaced driving belts 18 and 19 are arranged in parallel relationship and run in the lengthwise direction and between guide plates 12 and 13 as shown in FIGURE 1. The belts are each carefully positioned so that at least a part thereof extends into the recess 14 as illustrated in FIGURE 2. Each of the two belts is partially wound about a drive roller 21 and an idler roller 22 so that the longitudinal arrangement of the belts will be in the manner heretofore disclosed. The rollers 21 and 22 are respectively mounted for rotation about shafts 23 and 24.

The particular belts shown are of the type referred to as O-rings, having substantially the same dimensions insofar as their diameters and lengths are concerned. The most suitable belts are those having a relatively higher coefficient of friction sufficient to frictionally grip all documents to be handled in the manner shown in FIGURE 2 irrespective of random variations in the frictional characteristics of documents. An advantage of O-rings over conventional belts is that they have less of a tendency to ride up and down perpendicular to their direction of travel.

As may be seen from FIGURE 4, idler roller 22 is provided with a pair of circular grooves 25 and 26 for respectively guiding belts 18 and 19 thereabout. For alignment purposes, the inner perimeter of groove 25 is shown to have a slightly larger radius relative to shaft 24 than that defined by the inner perimeter of groove 26 relative to shaft 24. Assuming O-rings 18 and 19 to be of equal diameter, the combined diameter between the inner perimeters of the upper groove 25 and including the diameter of O-ring 18 may be defined as U, as illustrated in FIGURE 4, and the combined diameter between the inner perimeters of the lower groove 26 and including the diameter of O-ring 19 may be defined as L. The difference of U from L will give us 2X, where X is the distance by which the combined upper radius is offset from the combined lower radius as shown in FIGURE 4. In the present embodiment the equivalent measurements of drive roller 21 are made to be made the same as those of idler roller 22.

In an operative embodiment of the present invention, it was found that each of a number of measurements over a wide range and relating to various components of the hardware making up the invention was found to be suitable. One of such measurement arrangements was where the diameter of the O-ring was 0.139 inch, U and L were designed to be 1.309 and 1.249 inches respectively, whereby X would be 0.030 inch, and shafts 23 and 24 of the rollers were so positioned that O-ring 18 would be projected inwardly of recess 14 at a distance of .060 inch from the planar surface 12', and therefore, O-ring 18 would be projected inwardly of recess 14 at a distance of 0.030 from the planar surface 12'.

At the input area to guide plates 12 and 13, there is shown in FIGURE 1 a drive roller 27 secured to a shaft 28 which may be driven at a speed substantially the same as or higher than the speed at which drive roller 21 is driven. An idler roller 29 is made to be pivotable about a shaft 31 by way of interconnecting arm 32, and is adapted through spring 33 to be lightly biased against drive roller 27. Between the output of drive roller 27 and the pair of guide plates 12 and 13 for directing the document travel is a pair of angularly spaced directing plates 34 and 35 which terminate at areas adjacent the leading rounded edges 36 and 37 respectively forming an input to the passageway defined by the guide plates 12 and 13. At the output of the passageway an idler roller is pivotably mounted about shaft 39 through interconnecting arm 41 and is lightly biased against the drive roller 21 by way of spring 42.

In operation, assuming an input hopper to be located to the right of FIGURE 1, a document 17 will be fed between drive roller 27 and idler roller 29 to be driven via directing plates 34 and 35 into the mouth defined by guide plates 12 and 13. As the document enters the mouth it will be injected between O-rings 18, 19 and the planar surface 12' of guide plate 12 and due to the recess 14 the document will at this area be slightly deformed, as shown in FIGURE 2, in that it will be forced into the recess as a consequence of the O-rings partly protruding therein. As is disclosed, the main area of contact between the document and guide plate 12 will be at the sharp edges 15 and 16 provide for minimum friction between the document and guide plate as the document is impelled along the feed path. At the same time the document will bear against the O-rings and due to the relatively high coefficient of friction attributed to the O-rings the document will be positively driven toward an output stacking device of some sort.

The alignment feature of the present invention is obtained in that the driving of O-ring 18 about a greater roller diameter, on rollers 21 and 22, than the roller diameter about the same rollers on which O-ring 19 is driven, a surface speed on O-ring 18 is achieved which is greater than that on O-ring 19. The latter occurs since the tangential velocity at the grooved perimeters of the rollers is proportional to the radius times the angular velocity, whereby in this case the angular velocity is constant, thus an increased radius would increase the tangential velocity. As a result of an increased speed at a point on O-ring 18 relative to some point on O-ring 19, the tendency of the document is to be sufficiently guided downwardly to be registered or aligned against the base chassis 11 should the document have been misaligned to begin with.

It is to be noted that choice of the location of recess 14 as well as many other parameters defining the present invention might be optional and would be considered depending upon the various characteristics of the particular document handling system with which the present invention is to be employed. For example, the recess 14 might be angularly displaced with O-rings traveling at equal velocity to align the document, instead of using a pair of O-rings as heretofore described each proceeding at slightly different speeds with a recess 14 generally parallel to the registration surface.

It is additionally observed that the guide plate 13 was only found to be necessary when documents were being transported such high speeds to the extent that the air pressure which the traveling documents would encounter would tend to cause certain portions of at least the leading edge of the document to deflect in directions parallel to the direction of document travel and thus alter the document velocity and/or introduce the increased possibility of jamming to the document handling system. By utilization of the guide plate 13 such document deflection at high speeds would initially be avoided.

Attention is also directed to the fact that the components comprising the feed system of the present invention will have a long life since belts 18 and 19 will encounter minimum wear and tear in that only the lightly biased idler roller 38 is constantly bearing against the belts, and a polished metal or equally suitable substitute used for the guide plates is subject to minimum wear.

It is claimed:

1. Document handling apparatus comprising
belt means and a guide plate providing a longitudinal extending guideway disposed between the belt means and the guide plate through which at least one document is advanceable.
a longitudinal recess provided in the guide plate adjacent the belt means, at least a portion of said belt extending into said recess along said guideway,
and means for moving the belt means to cause each document to be advanced thereby along said guideway between said recess and said portion of the belt extending into the recess.

2. The combination according to claim 1 wherein said belt means comprises at least a pair of belts.

3. The combination according to claim 2 wherein each of said pair of belts is an O-ring.

4. The combination according to claim 1 wherein said guide plate has a planar surface exhibiting a relatively low coefficient of friction opposing said guideway.

5. The combination according to claim 4 wherein a sharp edge exists where said recess joins with the planar surface opposing said guideway.

6. The combination according to claim 3 wherein the O-rings are provided with a relatively high coefficient of friction to impart motion to a document in said guideway.

7. The combination according to claim 1 including a second guide plate having a planar surface opposing the guide plate with said recess and adjacent said guideway.

8. The combination according to claim 2 including a reference surface,
and means for providing the tangential velocity of one of said pair of belts to be increased relative to the tangential velocity of the other belt causing document registration against the reference surface.

9. Document handling apparatus comprising
a longitudinal extending planar surface guide plate,
at least a pair of endless belts driven adjacent the planar surface of said guide plate providing a longitudinal extending guideway disposed between the guide plate and the pair of endless belts through which documents were advanced.
a longitudinal recess provided in the guide plate along said guideway, at least a portion of both said belts extending into said recess along said guideway, the planar surface of said guide plate having a very low coefficient of friction to have a minimum effect on documents traveling at high speeds adjacent thereto,
said belts having a relatively high coefficient of friction for driving documents interposed between the belts and the planar surface of the guide plate along said guideway,
and means for moving the belts to cause each document to be advanced thereby.

10. The combination according to claim 9 including a reference surface,
and aligning means for providing the tangential velocity of one of said pair of belts to be increased relative to the tangential velocity of the other belt causing document registration against the reference surface.

11. The combination according to claim 10 wherein said belt moving means comprises at least a pair of longitudinally spaced rollers each having a pair of circular grooves for accepting said belts,
and said aligning means having the inner perimeter of one of said circular grooves in each of said rollers provided with a larger radius from the roller center than the other perimeter of said grooves.

12. The combination according to claim 9 wherein each of said pair of belts is an O-ring.

13. The combination according to claim 9 wherein a sharp edge exists where said recess is joined with the planar surface to provide minimum friction when contacted by a document traveling down the guideway.

14. Document handling apparatus comprising:
belt means including at least a pair of belts,
a guide plate providing a longitudinal extending guideway through which at least one document is advanceable,
a longitudinal recess provided in the guide plate adjacent the belt means, at least a portion of said belt means extending into said recess along said guideway,
means for moving the belt means to cause each document to be advanced thereby,
a reference surface, and
means for providing the tangential velocity of one of said pair of belts to be increased relative to the tangential velocity of the other belt causing document registration against the reference surface.

15. Document handling apparatus comprising:
a longitudinal extending planar surface guide plate,
at least a pair of endless belts driven adjacent the planar surface of said guide plate providing a longitudinal extending guideway through which documents are advanced,
a longitudinal recess provided in the guide plate along said guideway, at least a portion of said belts extending into said recess along said guideway, the planar surface of said guide plate having a very low coefficient of friction to have a minimum effect on documents traveling at high speeds adjacent thereto,
said belts having a relatively high coefficient of friction for driving documents interposed between the belts and the planar surface of the guide plate,
means for moving the belts to cause each document to be advanced thereby,
a reference surface, and
aligning means for providing the tangential velocity of one of said pair of belts to be increased relative to the tangential velocity of the other belt causing document registration against the reference surface.

16. The combination according to claim 15 wherein said belt moving means comprises:
at least a pair of lonigtudinally spaced rollers each having a pair of circular grooves for accepting said belts, and
said aligning means having the inner perimeter of one of said circular grooves in each of said rollers provided with a larger radius from the roller center than the other perimeter of said grooves.

References Cited

UNITED STATES PATENTS

| | | | |
|---|---|---|---|
| 3,198,517 | 8/1965 | Martin | 271—45 |
| 3,290,041 | 12/1966 | Cunningham | 271—45 |
| 3,346,255 | 10/1967 | Greenwood | 271—45 |

RICHARD E. AEGERTER, *Primary Examiner.*

U.S. Cl. X.R.

271—75